INVENTOR
OTTO E. SZEKELY
BY
Pennie, Davis, Marvin & Edmonds
HIS ATTORNEYS

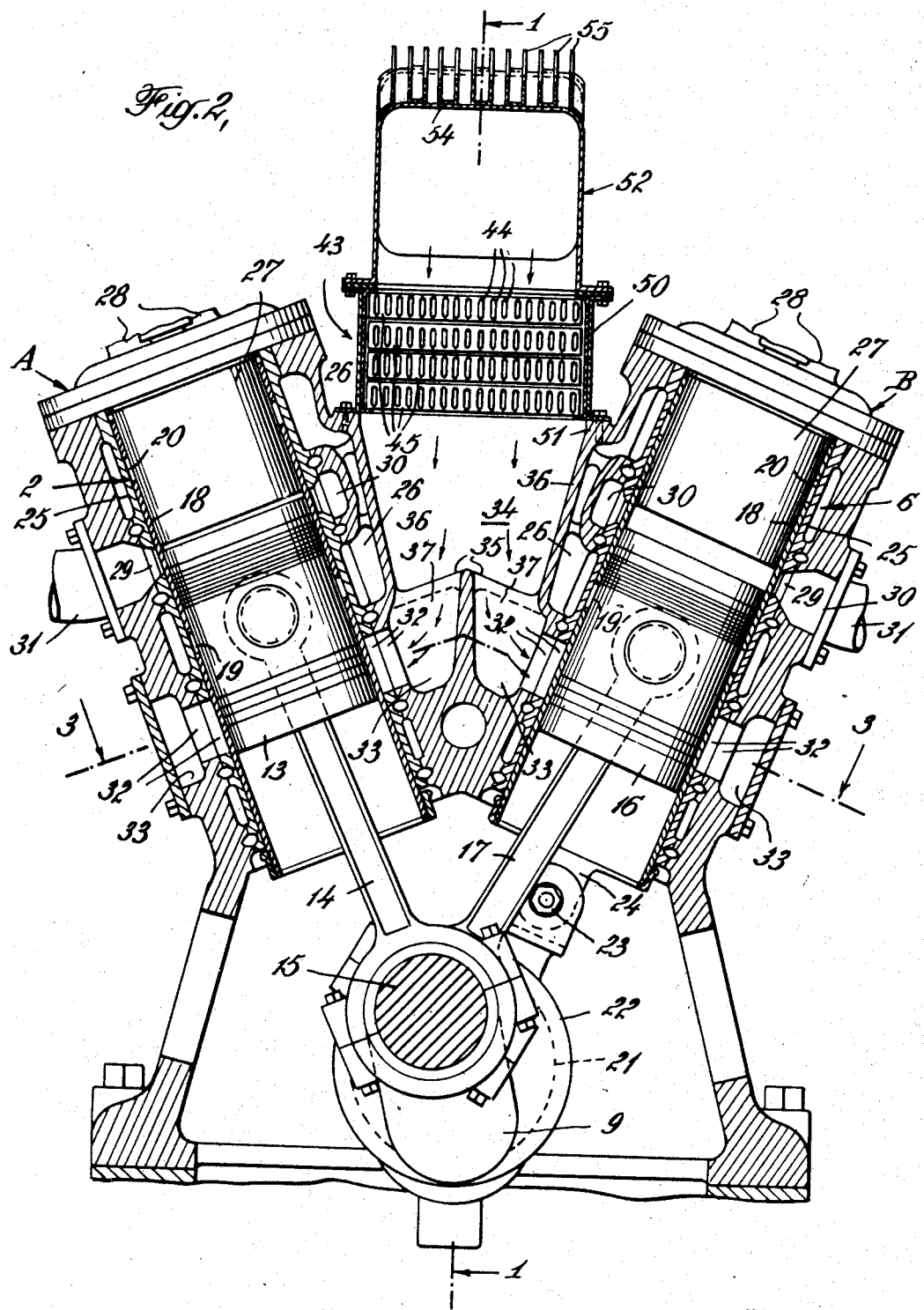

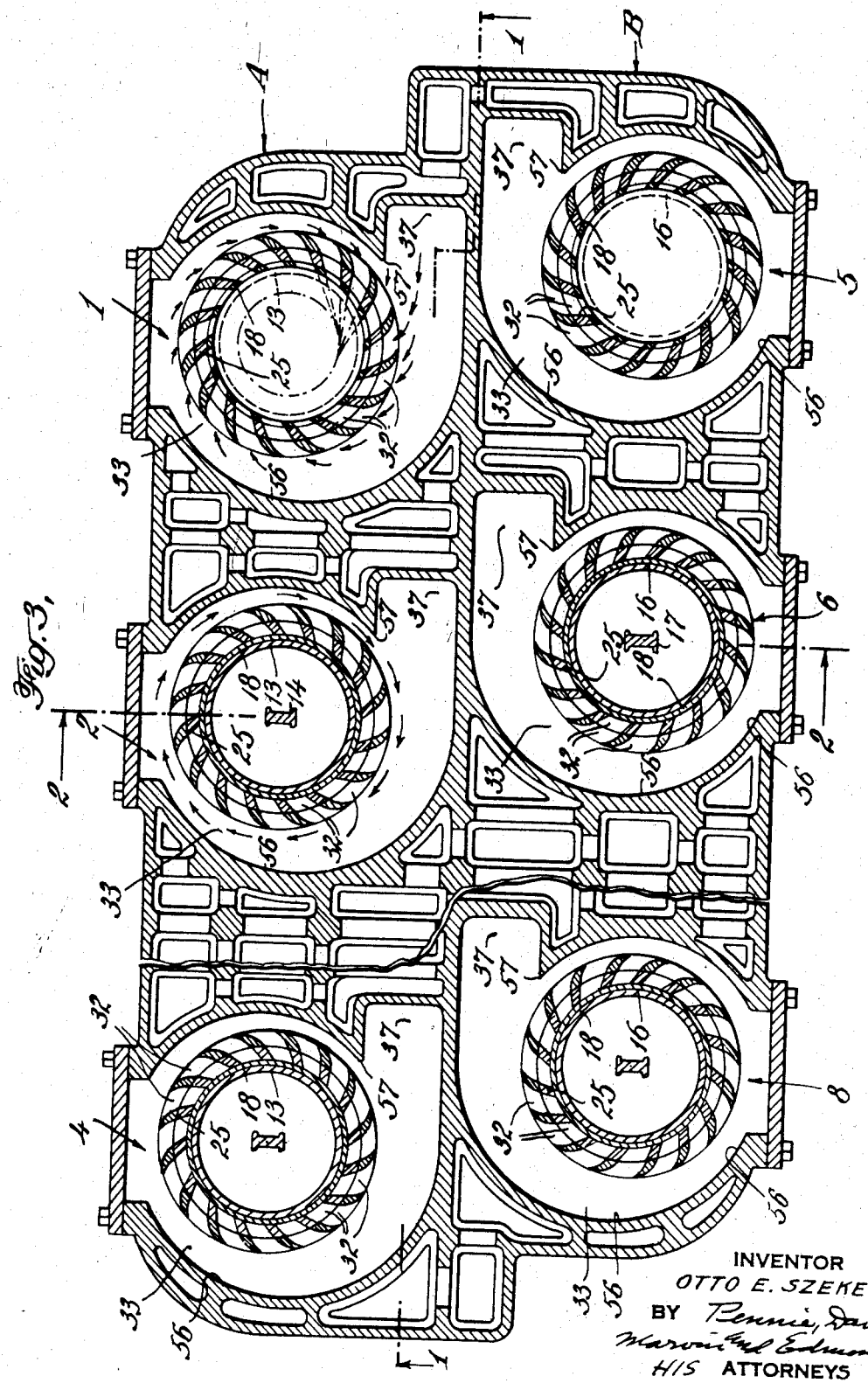

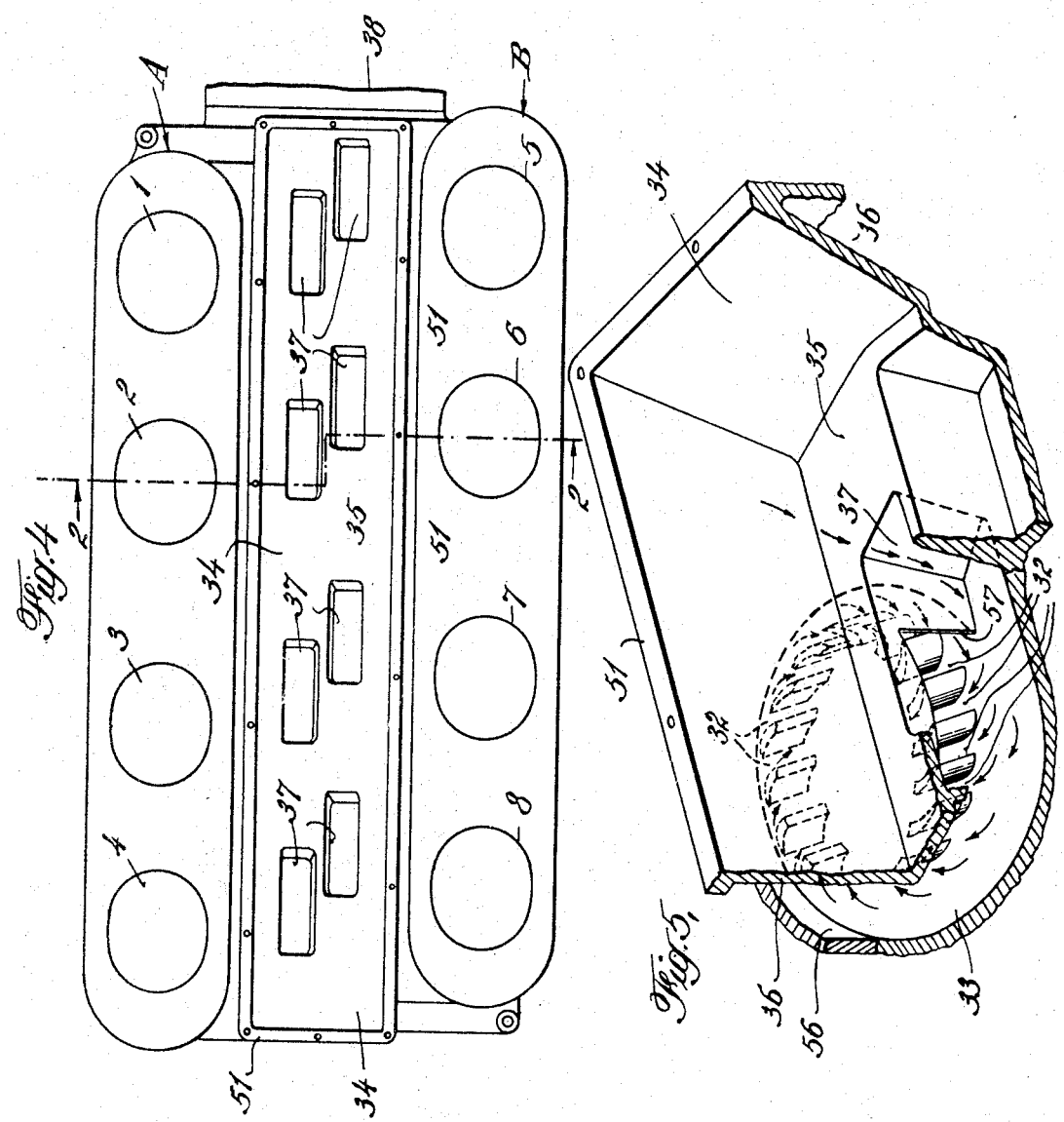

Patented July 25, 1944

2,354,227

UNITED STATES PATENT OFFICE 2,354,227

INTERNAL-COMBUSTION ENGINE

Otto E. Szekely, Philadelphia, Pa., assignor to Martin Motors, Inc., Dover, Del., a corporation of Delaware Original application September 23, 1941, Serial No. 411,956. Divided and this application February 25, 1942, Serial No. 432,315

6 Claims. (Cl. 123—55)

This invention relates to internal combustion engines, and especially to internal combustion engines of the compression-ignition type having mechanical injection of liquid fuel.

The general object of the invention is to provide an improved construction and arrangement of such engines by which the characteristics of the explosive charges within the engine cylinders are improved through providing greater uniformity in the charge received by each cylinder and by the same cylinder on successive strokes, and through better mixing of the charged air and fuel spray.

The invention aims to provide a construction and arrangement whereby the charging air is evenly distributed between the various cylinders of the engine so that all of the cylinders are uniformly charged with the same quantity of air, even when the engine is of comparatively large physical dimensions, so that each cylinder can be adjusted to produce maximum power.

The invention also aims to provide a construction and arrangement which affords cooling of the charging air as well as uniform distribution among the various engine cylinders.

Further, the invention aims to provide a construction and arrangement which produces a more dynamic rotation of the charged air within the cylinders which effects a more thorough and intimate mixing of the air and the injected fuel spray.

A still further object of the invention is to provide these features in an engine construction which embodies compactness and lightness of weight.

For a consideration of what I believe to be my invention, attention is directed to the accompanying drawings and the following description and to the claims appended thereto. The invention is illustrated in connection with an internal combustion engine of the V-type, but it is to be understood that it is not, necessarily, limited thereto. The invention is also shown as being applied to an engine in which the charging air is receved into the cylinders at the ends thereof nearest the crank shaft. It is to be understood, however, that it can also be used with engines where the air is delivered to the cylinders at or near their outer ends.

In these drawings:

Fig. 2 is a vertical transverse section taken on the plane indicated by the line 2—2 of Fig. 1;

Fig. 3 is a developed horizontal section taken on the planes indicated by the broken line 3—3 of Fig. 2 showing the arrangement of the air inlet chambers and ports;

Fig. 4 is a plan view of the engine with the parts above the line 4—4 of Fig. 1 removed, this view being drawn to a smaller scale; and Fig. 5 is a fragmentary view drawn in isometric projection to illustrate the entry of the charging air into a cylinder.

Figure 1:
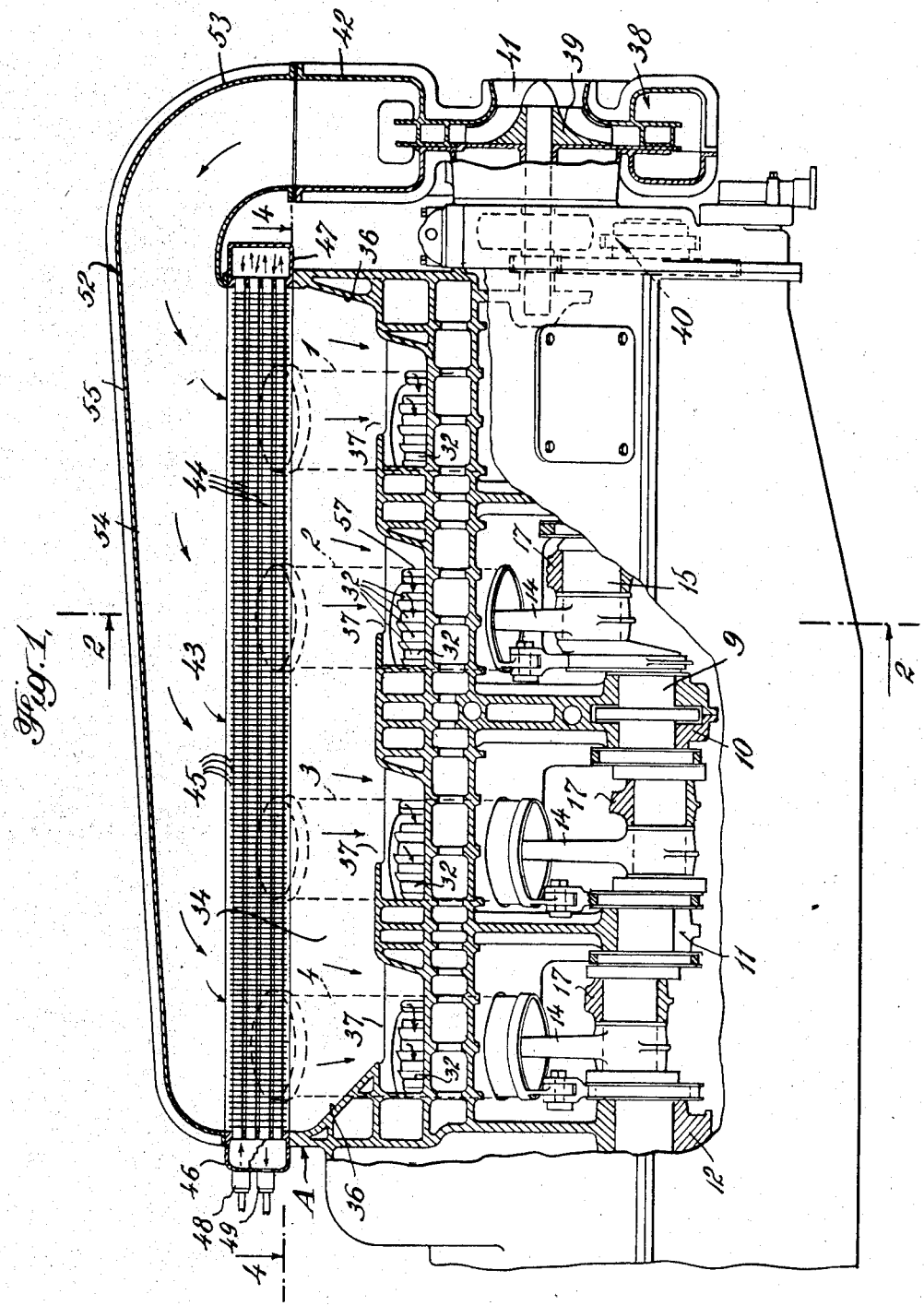
Fig. 1 is a view partly in central longitudinal vertical section, taken on the plane indicated by line 1—1 of Fig. 2, and partly in side elevation, of an internal combustion engine embodying the improvements of my invention.

Referring now to the accompanying drawings, the V-type engine illustrated has two banks of cylinders A and B each having four cylinders, the cylinders of bank A being indicated generally by numerals 1, 2, 3 and 4, respectively, and the cylinders of bank B by numerals 5, 6, 7 and 8, respectively. The crank shaft is indicated at 9 and is provided with four double cranks with suitable bearings in the engine frame as indicated, for example, at 10, 11 and 12. Each of the double cranks is operatively connected with two pistons operating in cylinders of opposite banks as is customary in V engines. Thus, for example, referring to Figs. 2 and 1, the piston 13 of cylinder 2 is connected by connecting rod 14 to crank 15 and piston 16 of cylinder 6 is connected by connecting rod 17 to the same crank 15.

In the engine illustrated, the opening and closing of the air admission and exhaust periods are controlled by means of a reciprocating sleeve 18 having air admission ports 19 and exhaust ports 20. Inlet ports 19 comprise a circular row of ports arranged in spaced relation to one another and extending entirely around the circumference of the sleeve. Exhaust ports 20 are similarly arranged. Both sets of ports cooperate with similar ports in the cylinder liner and cylinder block in the usual manner, as will be described later on.

The sleeve valve 18 is reciprocated by means of an eccentric 21 cooperating with which is an eccentric strap 22 which is pivoted at 23 to an extension 24 secured to the lower end of the sleeve. The construction of these sleeve valves 18 and their operating mechanism is the same for each of the cylinders. It will be understood that while the sleeve valve construction is preferred, the air inlet and exhaust can be controlled by other mechanism, if desired, such, for example, as the common arrangement where the air inlet is controlled by the engine piston and the exhaust by means of poppet valves.

In the present engine the sleeve 18 reciprocates in a cylinder liner 25 which is removably secured in the cylinder block but the cylinders may be integral with the cylinder block if desired. Surrounding the cylinders within the cylinder blocks are the usual passages 26 for the circulation of cooling liquid, such as water. It will be understood that the cooling system includes the usual radiator, pump and suitable connections, all of which are not shown.

The cylinders are closed at their outer ends by means of cylinder heads of covers 27 which extend for some distance into the sleeves 18, and have bolt flanges for securing them to the cylinder blocks. The cooling water is preferably circulated through these cylinder heads as well as around the cylinders. Each cylinder head 27 is provided with one or more fuel injection valves 28 through which the fuel is sprayed into the charge of highly compressed air within the cylinder in timed relation to each inward stroke of the piston, the engine illustrated being of the two-cycle type.

A row of exhaust ports 29 is arranged in the cylinder liner 25 just beneath the lower end of the cylinder head 27 to cooperate with the exhaust ports 20 of the sleeve valve. These ports open into an annular exhaust chamber 30 to which an exhaust pipe connection 31 is secured on the outside of the cylinders of each bank.

A row of charging air inlet ports 32 is arranged in the cylinder block around the lower portion of each cylinder liner 25 to cooperate with the air admission ports 19 of sleeve valve 18 so as to admit charging air into the cylinder during the time that the piston is near the outer (or lower) end of its stroke. These ports 32 open into an air inlet chamber 33 surrounding the cylinder and are of particular construction which will be described in detail later on.

In accordance with one of the features of my present invention, an elongated charging air supply chamber 34 is arranged longitudinally of the engine and disposed between the two banks of cylinders A and B. The bottom surface 35 of this chamber is somewhat above the level of the charging air admission ports 32. The side walls 36 extend upwardly from the bottom in substantially parallel relation and in close proximity to the cylinder banks A and B. The top of the air supply chamber 34 is preferably somewhat below the top of the cylinder block as indicated in Fig. 2.

Opening out of the lower portion of air supply chamber 34 and preferably opening out of the bottom wall 35 thereof are a plurality of passages 37 preferably rectangular in form, as shown in Fig. 4, and constituting air inlet openings for admitting air from the supply chamber 34 to the respective air inlet chambers 33 for each of the engine cylinders. The air inlet openings or passages 37 to the various cylinders are distributed over the area of the bottom of supply chamber 34, as may be seen in Fig. 4.

The charging air for the engine is supplied under suitable pressure by means of a centrifugal or rotary air compressor 38 mounted on the front end of the engine. The rotor 39 of this compressor is designed to operate at extremely high speed, in the neighborhood of 20,000 revolutions per minute, and is driven through an appropriate transmission gearing, indicated generally by numeral 40, from the main shaft 9 of the engine. The air inlet is shown at 41 at the front of the air compressor and the air outlet from the compressor is above and is indicated by numeral 42.

Inasmuch as the volume of air required by the engine is comparatively large and since the compressor 39 is located at one end of the engine, the distribution of the air so that each of the 8 cylinders will be charged uniformly, presents something of a problem. In addition, the air is compressed to about 10 lbs. per sq. in. and the heat of compression is substantial and raises the temperature of the air some 110° F., so that if the temperature of the air at the intake of the compressor is 80° F., the temperature of the air in the outlet 42 of the compressor is about 190° F. If the air is charged into the engine cylinders at this temperature, it will disadvantageously affect both the main cooling system of the engine and the proper rate of temperature rise of the charged air, on the compression stroke, and hence the proper combustion of the fuel, within the engine cylinders.

In order to obviate these difficulties there is provided on the top of the air supply chamber 34 an air cooling heat exchanger which is indicated generally by numeral 43. This heat exchanger comprises a bundle of flattened tubes 44 arranged on edge so that the air can pass downwardly between them, and also provided with closely spaced vertical heat-transferring fins 45. The tubes 44 are connected to suitable headers 46 and 47, and inlet and outlet connections 48 and 49 for the cooling liquid are provided as shown in Fig. 1. Any convenient source of cooling liquid may be used.

The tube bundle is arranged within a suitable casing 50 flanged at both bottom and top and both the tube bundle and the casing extend the entire length of air supply chamber 34, casing 50 being bolted, as shown in Fig. 2, to a flat rim 51 which extends around the periphery of the mouth of air supply chamber 34. The walls of casing 50 are parallel, the entrance to the air passageway of the heat exchanger having substantially the same area as the mouth of the air supply chamber, so that air may be delivered from the air supply compressor 38 simultaneously to all portions of the upper surface of the tube bundle of the air cooler. This air is conveyed from the outlet 42 of the air compressor by means of a conduit 52 which is bolted to the flange at the upper end of casing 50. Conduit 52 comprises a tubular elbow portion 53 which is connected to the outlet 42 of the air compressor and a hood-like portion 54 which delivers the air to the intake of the air passageway of the heat exchanger. Preferably the outer surface of the conduit 52 is provided with heat radiating flanges 55 for the purpose of assisting in removing heat of compression imparted to the air.

In view of the high velocity of the impeller 39 of the air compressor 38 the air enters the elbow portion 53 of conduit 52 at a very high velocity, in the neighborhood of 60,000 feet per minute. However, due to the great enlargement of the area of the hooded portion 54 of conduit 55 and to the resistance of the multiplicity of small air passages formed by the cooling tubes 44 and fins 45, this velocity is greatly reduced when the air enters these cooling passages of the air cooler. Due to the resistance of the multiplicity of air passages of the air cooler there is a pressure drop of about 2 pounds in passing through the cooler so that the pressure in the air supply chamber 34 is about 8 pounds per square inch.

The temperature reduction in passing through the air cooler is approximately the same as the temperature rise due to heat of compression in the compressor 38 so that the temperature of the air in supply chamber 34 is about the same as that of the outside air which was assumed as 80° F. Hence the air delivered to the engine cylinders from supply chamber 34, although at a pressure much higher than that of the atmosphere, has a temperature which is about the same as the atmospheric temperature.

Consequently the rate of temperature rise during the period of compression in the engine cylinders is affected by the increase in charging pressure. Also due to the drop in pressure of the air in passing through the multiplicity of restricted passageways of the heat exchanger and also because of the possibility of free transfer or flow of air between various portions of the supply chamber 34, the air is distributed uniformly among the 8 cylinders of the engine so that at each stroke each cylinder receives substantially the same quantity of air.

In order to improve the combustion characteristics of internal combustion engines of the compression ignition type it has heretofore been proposed to introduce the scavenging and charging air through tangentially arranged ports so as to produce a whirling action, or rotation, of the air within the cylinder, and advantage has been taken of the persistence of this motion of the air after compression and during the injection of the fuel, to assist in mixing the fuel spray and air.

In engines as heretofore constructed, however, the motion of the scavenging and charging air outside of the engine ports was stopped by the closing of the ports. Therefore, at each opening of the ports this air had to be set in motion before it could commence to enter the cylinder, and since air possesses considerable mass and inertia, and since the period of time elapsing between the opening and closing of the air admission ports, in high speed engines is a small fraction of a second, the overcoming of the inertia of the air has a tendency to reduce to a greater extent than has heretofore been appreciated both the dynamic effect of the rotating air and the quantity of air entering the cylinder for each charge.

In accordance with another feature of my present invention this difficulty has been overcome through the provision of a construction by which the air adjacent the inlets or air admission ports is caused to remain rotating around the ports during the intervals when the admission of air is cut off by the closing of the inlet ports so that the air is in effective motion at the instant the inlet ports open. In this way delay in the entrance of the air into the cylinder is largely eliminated, and greater, or more dynamic, rotation is imparted to the charge of air within the cylinder so that the air rotation persisting at the instant of fuel injection is greater and a more intimate mixture of the fuel spray and air is obtained.

Referring now to Figs. 3, 4 and 5 of the accompanying drawings, each opening 37 from the air supply chamber 34 to a cylinder constitutes an air passage extending downwardly and substantially tangentially of the air inlet chamber 33 which surrounds the cylinder. Inlet chamber 33 preferably is provided with a spiral-shaped outside wall 56 so as to gradually reduce the cross sectional area and equalize the distribution of the air to the ports 32. This wall 56 is continued around the engine cylinder until it intersects the wall of air passage 37 at a point 57 which is spaced radially outward from the outer edges of ports 32 so as to leave an air passage at this intersection. In this way the air inlet chamber 33 is made to extend continuously around the circular row of ports 32 surrounding the cylinder.

In operation, therefore, the air passing downwardly from air supply chamber 34 into an air passage 37 which is substantially tangent to the boundary of the outer edges of the inlet ports 32, is directed by this air passage, by the spirally shaped outer wall 56 of chamber 33 and by the tangential ports 32 into the cylinder and simultaneously set in rotating motion. Assuming now that the admission ports are closed, as, for example, by the movement of the sleeve valve 18, the air in the air inlet chamber 33 continues to rotate around the cylinder since this inlet chamber is a continuous passageway extending entirely around the circular row of inlet ports 32.

Since the interval of time during which the inlet valve is closed, particularly in a two-cycle engine, is so minute, this rotation of the air in the inlet chamber 33 will persist and the air will be rotating vigorously at the next opening of the air admission ports by sleeve 18. Consequently the air commences instantly to enter the cylinder since it is unnecessary to overcome the inertia which the air in this inlet passage would have if stationary.

By means of the present invention there has been provided a construction and arrangement of internal combustion engine of the compression ignition type in which the charging air is introduced under a high degree of supercharge, and is distributed with substantial uniformity to all of the engine cylinders, advantage being taken of the action of an air cooling heat exchanger to equalize the distribution of the air, the heat exchanger at the same time removing heat of compression so that the air is supplied to the cylinders at a temperature which does not improperly affect the rate of temperature rise during the compression ignition stroke.

By this invention also, a construction and arrangement of air inlet chamber has been provided by means of which a ring of air surrounding the inlet ports is maintained in continuous rotation not only during the air admission period but also during the intervals when the inlet ports are closed. This eliminates the necessity to overcome the inertia of stationary air each time the air admission valve opens, and the dynamic effect of the incoming air in producing a whirling of the charge is increased. Thus the compressed charge of air is in more effective rotation at the period of fuel injection.

By means of these features of the invention, the characteristics of the explosive charge have been improved first by providing uniformity of the quantity of air supplied to each cylinder and at each successive stroke, by supplying this air at a temperature which permits the proper rate of temperature rise on the compression stroke and by providing for a more substantial persistence of air rotation during fuel injection.

It will be understood that many details of the internal combustion engine illustrated in the accompanying drawings are unnecessary to a carrying out of the invention, and that the particular engine shown and described has been used merely as an exemplifying disclosure, and that changes may be made without departing from the scope of the invention which is set forth in the appended claims.

This application is a division of my copending application Serial No. 411,956, filed September 23, 1941, entitled Internal combustion engine.

I claim:

1. In an internal combustion engine having a cylinder, a plurality of tangentially directed air inlet ports through its walls and arranged around the circumference thereof, a charging air supply, an inlet chamber to convey air to be admitted into the cylinder to said inlet ports, said chamber having therein air directing vanes between adjacent inlet ports and cooperating therewith to set the air to be admitted into the cylinder in rotation, said inlet chamber being of spiral form having its large end connected with said charging air supply and its small end disposed close to but slightly spaced from said vanes.

2. In an internal combustion engine having a cylinder, a plurality of tangentially directed air inlet ports arranged around the circumference thereof at its inner end, a charging air supply, and a spirally arranged air inlet chamber surrounding the cylinder at its inner end to convey air to said inlet ports, both the larger and the smaller ends of said spiral chamber being connected to the charging air supply, the air in said inlet chamber being set in rotation during admission of air into the cylinder through said ports and the air rotation continuing during the intervals when air admission to the cylinder is cut off.

3. In an internal combustion engine having a cylinder, a plurality of tangentially directed air inlet ports arranged around the circumferences thereof, a charging air supply, and a spirally arranged air inlet chamber surrounding the cylinder to convey air to said inlet ports, both the larger and the smaller ends of said spiral chamber being connected to the charging air supply, the air in said inlet chamber being set in rotation during admission of air into the cylinder through said ports and the air rotation continuing during the intervals when air admission to the cylinder is cut off.

4. In an internal combustion engine having two banks of cylinders arranged in V formation, an elongated charging air storage chamber arranged longitudinally of the engine and disposed in the V-shaped space between the two banks of cylinders, said cylinders having air admission ports at their inner ends and the inner surface of said storage chamber being disposed outwardly from said ports, a plurality of well-like openings distributed over the inner surface of said storage chamber one adjacent each cylinder and extending inwardly opposite said air admission ports, said ports being tangentially directed, air directing vanes arranged between adjacent ports of each cylinder and cooperating therewith to set in rotation the air admitted into the cylinder, and a spiral air inlet chamber surrounding said vanes, the large end of said spiral chamber being arranged to receive air from one of said well-like openings, and the small end of the spiral chamber being disposed close to but slightly spaced from said vanes.

5. In an internal combustion engine having two banks of cylinders arranged in V formation, an elongated charging air storage chamber arranged longitudinally of the engine and disposed in the V-shaped space between the two banks of cylinders, said cylinders having air admission ports at their inner ends and the inner surface of said storage chamber being disposed outwardly from said ports, a plurality of well-like openings distributed over the inner surface of said storage chamber one adjacent each cylinder and extending inwardly opposite said air admission ports, said ports being tangentially directed to set in rotation the air admitted into the cylinder, and a spiral air inlet chamber surrounding said vanes, the large end of said spiral chamber being arranged to receive air from one of said well-like openings, and the small end of the spiral chamber being disposed close to but slightly spaced from said vanes.

6. In an internal combustion engine having two banks of cylinders arranged in V formation, an elongated charging air storage chamber arranged longitudinally of the engine and disposed in the V-shaped space between the two banks of cylinders, said cylinders having air admission ports at their inner ends and the inner surface of said storage chamber being disposed outwardly from said ports, a plurality of well-like openings distributed over the inner surface of said storage chamber one adjacent each cylinder and extending inwardly opposite said air admission ports, and an air inlet chamber surrounding each cylinder to receive air from one of said well-like openings and deliver it to said air admission ports.

OTTO E. SZEKELY.